April 28, 1970     R. H. MAYER     3,508,807

LIGHT PIPE CONNECTOR

Filed Oct. 27, 1967

INVENTOR.
Richard H. Mayer
BY John R. Faulkner
E. Dennis O'Connor
ATTORNEYS.

United States Patent Office 3,508,807
Patented Apr. 28, 1970

3,508,807
LIGHT PIPE CONNECTOR
Richard H. Mayer, Dearborn, Mich., assignor to Ford Motor Company, Dearborn, Mich., a corporation of Delaware
Filed Oct. 27, 1967, Ser. No. 678,601
Int. Cl. G02b 5/14
U.S. Cl. 350—96                                          4 Claims

ABSTRACT OF THE DISCLOSURE

Apparatus for optically connecting a plurality of light pipes to a single light pipe. Lense means are utilized to gather the light emitted from the plurality of light pipes, transform the gathered light to parallel light rays and focus the parallel rays at the end of a single light pipe. Within the single light pipe, the focused light rays are intermingled.

BACKGROUND OF THE INVENTION

The use of "light pipes"—elongated light conducting elements constructed of fibrous or solid acrylic plastic or glass and capable of transmitting light along the lengths thereof—is well known in the art. Prior to this invention, connection of distinct light pipes has been limited to the joining of two light pipes end-to-end by bonding or mechanical connection.

An object of this invention is to provide apparatus for connecting a plurality of light pipes to a single light pipe so that the single pipe will transmit a high percentage of the total light transmitted by the plurality of pipes connected thereto. This connection is made optically without the need for mechanical bonding or splicing. The optical means utilized are of simple design and ease of construction and assembly.

SUMMARY OF THE INVENTION

Apparatus for optically connecting a plurality of light pipes to a single light pipe and constructed in accordance with this invention includes a housing supporting said light pipes so that the ends of the plurality of light pipes are spaced from an end of the single light pipe. First optical means are positioned in said housing between the ends of the plurality of light pipes and the end of the single light pipe. The first optical means gather the light emitted from the ends of the plurality of light pipes and transform the gathered light into substantially parallel light rays. Second optical means also are positioned in said housing between the end of the single light pipe and the first optical means. The second optical means focus the parallel rays of light on the end of the single light pipe that then transmits the light focused thereupon.

DETAILED DESCRIPTION OF THE INVENTION

Figure 1:
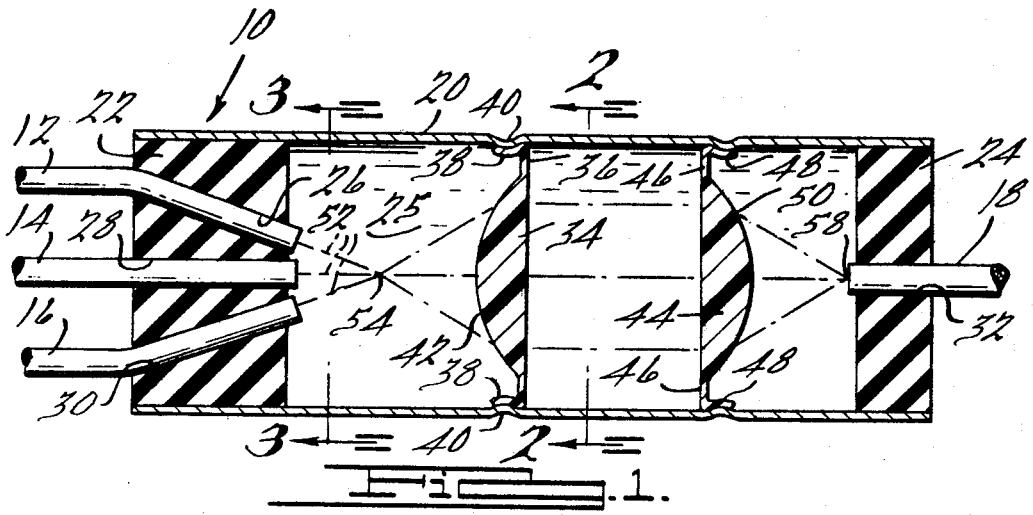
FIGURE 1 is a sectional side elevation view of the light pipe connecting device of this invention.
Figure 2:
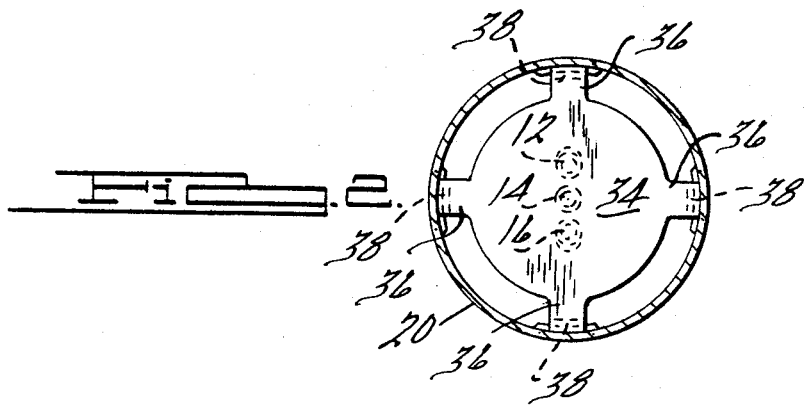
FIGURE 2 is a sectional view taken along the line 2—2 of FIGURE 1.
Figure 3:
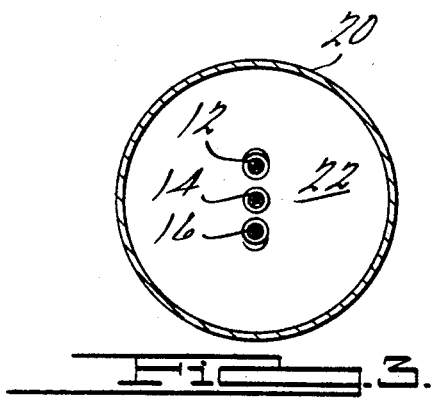
FIGURE 3 is a sectional view taken along the line 3—3 of FIGURE 1.

Referring now in detail to the drawings, the numeral 10 denotes generally light pipe connecting apparatus constructed in accordance with this invention and optically connecting a plurality of light pipes 12, 14 and 16 to single light pipe 18. It is to be understood that the illustrated connection of three light pipes to a single light pipe is for purposes of example only and that the principles of this invention may be used to interconnect any desired member of light pipes to a single light pipe. Light pipes as illustrated in the drawings are well known in the art and are available commercially as "Crofon Light Guides."

The light pipe connecting device includes a housing 20 formed in the shape of a tube or hollow cylinder and having thickened end walls 22 and 24 formed from opaque material. Holes 26, 28 and 30 extend through housing end wall 22 and receive corresponding end portions of light pipes 12, 14 and 16 in a manner to be described in detail below. A single hole 32 extends through housing end wall 24.

Mounted within housing cavity 25 is a plano-convex lens 34 having a plurality of projections 36 extending radially therefrom. Resiliently deformable feet 38 are formed on the ends of each of the projections 36 and interlock with indentations 40 formed in the wall of housing 20 thereby holding lens 34 in the position illustrated. Lens 34 is oriented such that its arcuate surface 42 is proximate the ends of light pipes 12, 14 and 16. A second plano-convex lens 44, having radially extending projections 46 and integrally formed resiliently deformable feet 48 interlocking with indentations in housing 20, is positioned within housing 25 such that its arcuate surface 50 is proximate the end of light pipe 18.

With reference to the operation of the light pipe connecting device described above, it may be assumed that this device is being utilized to optically connect the plurality of light pipes 12, 14 and 16 to the single light pipe 18 so that colored light flowing through light pipes 12, 14 and 16 is intermingled and transmitted along light pipe 18 as white light. For purposes of this example, light pipes 12, 14 and 16 may be considered as being colored red, blue and yellow respectively. The light transmitted along the plurality of light pipes 12, 14 and 16 is colored correspondingly and it is well known that a combination of red, blue and yellow light forms white light.

As may be seen in FIGURE 1, apertures 26, 28 and 30 are formed through end wall 22 of housing 20 so that extensions of the longitudinal axes of light pipes 12, 14 and 16, received in these apertures, will intersect at point 54. Point 54 is the focal point of lens 34. Light rays emitted from light pipes 12, 14 and 16, represented by the lines 52, thus intersect at focal point 54 of lens 34. This light is transformed by lens 34 into parallel rays of light 56. The parallel rays of light, upon passing through lens 44, are focused at focal point 58 of lens 44. Focal point 58 coincides with the end of light pipe 18 so that the light transmitted by the plurality of light pipes 12, 14 and 16 is optically focused on light pipe 18 for transmission along light pipe 18. Of course, the light focused on the end of light pipe 18 is intermingled within this light pipe. This intermingling of light within light pipe 18 provides that the red, blue and yellow light, transmitted by light pipes 12, 14 and 16 respectively, forms white light within light pipe 18.

It readily may be appreciated that if more than three light pipes were to be optically connected with light pipe 18, various color shades may be used for the material of the more than three light pipes such that white light would result in light pipe 18.

It thus may be seen that this invention provides a device for optically connecting a plurality of light pipes to a single light pipe such that light transmitted through said plurality of light pipes is gathered and focused on the single light pipe for transmission therealong. This optical connection is made without resort to mechanical bonding or splicing of individual light pipes.

I claim:
1. Apparatus for optically connecting a plurality of individual light pipes to a single light pipe, said apparatus comprising: housing means supporting each of said in- dividual light pipes so that the ends of said plurality of individual light pipes are spaced from an end of said single light pipe and from each other, first optical lens means positioned in said housing adjacent the ends of said plurality of light pipes gathering light emitted from the ends of said plurality of light pipes and transforming said light into substantially parallel light rays, and second optical lens means positioned in said housing between said first optical means and the end of said single light pipe and focusing said parallel rays of light on the end of said single light pipe, said plurality of individual light pipes being supported in said housing means so that extensions of the longitudinal axes of each of said plurality of individual light pipes pass through the front focal point of said first optical lens means.

2. The apparatus of claim 1, wherein said housing means includes a hollow cylinder, one end wall of said cylinder having a plurality of apertures extending therethrough, each of said apertures receiving one of said plurality of light pipes, the other end wall of said cylinder having a single aperture extending therethrough receiving said single light pipe, said first and second optical lens means mounted within said cylinder between said end walls.

3. The apparatus of claim 1, wherein said first and second optical lens means comprises plano-convex lenses, with the planar surfaces facing each other.

4. Apparatus according to claim 1, wherein the light emitted from said plurality of light pipes is colored light, said colored light forming white light when intermingled, said first and second optical lens means causing said colored light to be intermingled in said single light pipe to form white light.

References Cited

UNITED STATES PATENTS

| | | |
|---|---|---|
| 2,190,294 | 2/1940 | Mili. |
| 3,033,071 | 5/1962 | Hicks _____ 350—96 |

FOREIGN PATENTS

| | | |
|---|---|---|
| 1,017,354 | 1/1966 | Great Britain. |
| 1,369,010 | 6/1964 | France. |

DAVID H. RUBIN, Primary Examiner

U.S. Cl. X.R.

350—252